A. DAMERON.
GASOLENE FILTER.
APPLICATION FILED MAR. 29, 1916.
1,227,999.
Patented May 29, 1917.
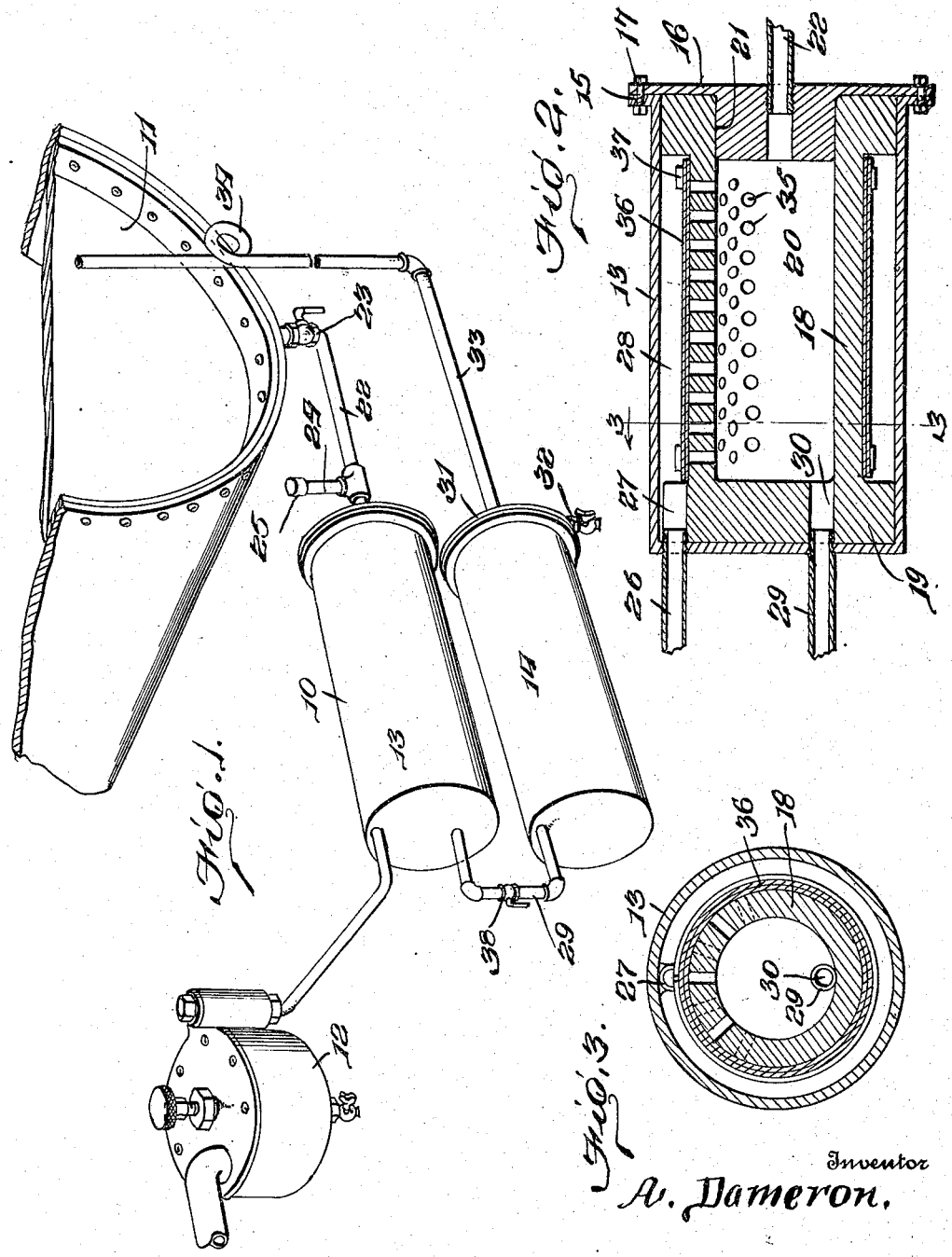
Inventor
A. Dameron.
By
[signature], Attorneys

UNITED STATES PATENT OFFICE.

ADOLPHUS DAMERON, OF WASHINGTON, DISTRICT OF COLUMBIA.

GASOLENE-FILTER.

1,227,999.  Specification of Letters Patent.  Patented May 29, 1917.

Application filed March 29, 1916. Serial No. 87,545.

*To all whom it may concern:*

Be it known that I, ADOLPHUS DAMERON, a citizen of the United States, residing at Washington, in the District of Columbia, have invented certain new and useful Improvements in Gasolene-Filters, of which the following is a specification.

My invention relates to new and useful improvements in filters, the primary object of my invention being the provision of a filtering device for gasolene particularly adapted for application between the fuel supply tank and carbureter of an internal combustion engine, such as the engine of an automobile.

One of the primary objects of my invention consists in the provision of a filter of the above described character which will not only remove mechanical impurities, such as dirt and the like, from the gasolene being filtered, but which will also separate the gasolene from any water which may be in it and absolutely prevent passage of such water to the carbureter.

In this connection, I provide what may be termed a water trap in which any water separated from the gasolene by the filter is collected and from which such water may be drawn from time to time. It will, therefore, be clear that the carbureter may be primed with absolutely pure gasolene if, immediately before priming the carbureter, any water in the filter is drawn off until pure gasolene begins to flow from the filter.

A still further object of my invention consists in providing a filter of the above described character which is simple in construction and which may be readily inserted in any fuel supply pipe so it may be readily disassembled for cleaning purposes, when necessary.

With these and other objects in view, my invention will be more fully described, illustrated in the accompanying drawings, and then specifically pointed out in the claims which are attached to and form a part of this application.

In the drawings:

Figure 1 is a perspective view of my improved filter in use;

Fig. 2 is a central longitudinal sectional view through the filter proper;

Fig. 3 is a transverse sectional view taken on the line 3—3 of Fig. 2.

Corresponding and like parts are referred to in the following description and indicated in all the views of the drawings by the same reference characters.

In order to insure a clear and accurate understanding of my invention I have illustrated my improved filter, indicated as a whole by the numeral 10, in connection with a gasolene supply tank 11 of a type commonly used upon motor vehicles and a carbureter 12 which may be of any suitable design. Broadly speaking, my filter includes a filtering cylinder 13, a water trapping cylinder 14 and suitable connections between the tank 11 and filtering cylinder, between the filtering cylinder and carbureter and between the filtering cylinder and the trap 14, as well as an atmospheric vent for the trap.

The cylinder 13 is closed at one end and provided at its opposite end with a peripheral flange 15, this end being normally closed by a removable head 16 which is secured to the flange 15 by bolts or other suitable fastening means 17, a gasket being preferably interposed between the head 16 and flange to prevent leakage of gasolene therefrom. Located within the cylinder 13 is a filter proper 18 which may be formed of wood, metal or other suitable material. This filter is cylindrical in shape, being of less diameter than the internal diameter of the containing cylinder 13 and at its ends is formed with peripheral flanges 19 which fit snugly within the cylinder 13, the filter being equal in length to the internal length of the cylinder within which it seats. This filter is formed with an axially extending chamber 20 which opens through the outer end of the filter body and which, when the filter body is in place within the cylinder 13, is closed by a cylindrical boss 21 formed upon the inner face of the cylinder head 16 and adapted to be wedged in the open end of the chamber.

A pipe 22, which constitutes the fuel supply pipe for the carbureter 12, leads from the gasolene tank 11 through the head 16 and its boss into the chamber 20 of the filter, as clearly shown in Fig. 2, a cut-off valve 23 of any suitable design being interposed in this pipe and the pipe, adjacent the cylinder 13, being preferably formed with a branch 24 normally closed by a removable cap 25 and adapted to receive a hose from an air pump or compressed air tank in order that the filter may be blown out from time to time, as will be later explained. The closed end of the cylinder 13, adjacent its top, is formed with a threaded opening to receive one end of a pipe 26 which leads to the fuel intake port of the carbureter 12 and this pipe preferably projects somewhat within the cylinder to seat within a passage 27 formed through the adjacent flange 19 of the filter 18 in order that it may communicate with the annular chamber 28 formed between the outer surface of the filter 18 and the inner face of the cylinder 13, and further in order that it may hold the filter in a certain predetermined position relative to the cylinder 13. A pipe 29 is also threaded through the end of the cylinder 13 and projects a slight distance into a passage 30 formed in the closed end of the filter 18 and communicating with the axial chamber 20 of the filter. This pipe, at its other end, leads into the upper portion of the water trapping cylinder 14, as clearly shown in Fig. 1.

This water trapping cylinder 14 is merely a cylindrical tank of sheet metal or other suitable material, preferably provided at one end with an integrally formed head and at its other end with a removable head 31, corresponding to the head 16 of the cylinder 13. A drain cock 32 serves as a means for draining water or other impurities from the cylinder 14 and a pipe 33 leads from the cylinder head 31 and extends upwardly to a point above the highest liquid level of gasolene in the fuel supply tank 11, this pipe intermediate its length, being bent to provide a vertically disposed coil 34 forming a liquid seal.

Referring again to the construction of the filter proper 18, it should be noted that the seating of the ends of the pipes 26 and 29 in the passages 27 and 30 holds the filter body 18 in a certain predetermined position with respect to its casing or cylinder 13. The upper wall of the filter, when so held, is formed with a series of openings 35 through which gasolene admitted through the pipe 22 may pass and one or more thicknesses of chamois 36 wrapped about the filter 18 between its flanges 19 covers these openings and, as a consequence, filters all liquid passing from the chamber 20 to the chamber 28. Split resilient clamping rings 37 or other suitable means may be provided for holding the chamois in place.

From the foregoing description, taken in connection with the drawings, the application and operation of my improved filter will be readily understood. Obviously, the filter, which is relatively small may be connected into the fuel feed pipe of any motor vehicle without difficulty, being located preferably at the rear of the vehicle where it will be readily accessible for the purposes of cleansing. When connected in the fuel supply system, as shown in Fig. 1, with the cock 23 open, it will be apparent that gasolene, together with any impurities contained in it, passing from the tank 11, will enter the axial chamber 20 of the filter and pass from this chamber through the pipe 29 to the water trapping cylinder 14 and pipe 30, filling such pipe to the level of the gasolene in the tank 11. The chamois 36, which thus becomes moistened with gasolene, due to the preponderance of gasolene over any water contained in it, will, as is well known, therefore, permit passage of gasolene but prevent passage of water. Any water in the gasolene cannot, therefore, escape through the chamois into the chamber 28 from which the supply pipe of the carbureter leads and the carbureter will obtain only gasolene from which all mechanical impurities and water have been separated by the filter. As the water is heavier than the gasolene, it will be apparent that this water will pass through the pipe 29 and collect in the lower portion of the water trapping cylinder 14 from which it may be withdrawn from time to time by the drain cock 32. Whenever the carbureter is to be primed, the operator may absolutely insure passage of nothing but pure gasolene to it by opening the drain cock 32 and permitting all water which may be within the filter to escape and then closing the trap and priming the carbureter. Although the water trapping cylinder 14 will, under most conditions, fill almost entirely with gasolene, it will be clear that as water accumulates in this cylinder the gasolene contained therein will be displaced and forced upwardly in the chamber 20 into the filter and from this chamber into the chamber 28. The liquid seal 34 in the atmospheric vent pipe 33 prevents entrance of impurities to the filter.

By constructing the cylinder 13 in the manner shown in Fig. 2, it will be clear that the cylinder head 16 may be at any time removed, the fuel supply pipe 22 being usually constructed of flexible copper piping, and that a removal of this cylinder head will permit withdrawal of the filter proper 18 in order that any impurities accumulated in the filter may be removed. If for any possible reason, the entire filter should become impregnated with water or a poor grade of gasolene, the cock 23 may be closed and the cock 32 opened to entirely drain the filter, after which a hose may be connected to the pipe 24 and air blown through the filter to completely dry it out.

Obviously, the filtering chambers 11 and 14, previously referred to as cylinders, may be constructed in any other shape, if desired, and may be secured to each other by a common bracket by means of which they may be supported upon the frame of the vehicle, the sole restriction being that the water trapping cylinder 14 be located at a level below the cylinder 13. Furthermore, it is, of course, obvious that any desired number of water trapping cylinders or chambers 14 may be employed providing they are all either connected with the axial chamber of the filter 18 or all connected with each other and one with such chamber. Unless, however, a very inferior grade of gasolene is employed, one water trapping cylinder should be sufficient.

The overflow pipe 33 or atmospheric vent may be employed as a gage for determining the level of gasolene in the main tank 11, as will be readily understood. Preferably, also, I provide the pipe 29 which connects the chambers 13 and 14 with a cut off valve 38 in order that the chamber 14 and overflow pipe 33 may be drained through the cock 32 without any loss of gasolene from the chamber 10.

Having thus described the invention, what is claimed as new is:

1. A gasolene filter including a cylinder, a removable cylinder head closing one end of the cylinder and formed with an inwardly projecting boss, a filter proper fitting snugly within the cylinder and formed with an axial chamber opening through one end and normally closed by the boss, the filter proper being peripherally channeled exteriorly to provide an annular chamber between it and the cylinder and having its upper portion formed with openings establishing communication between the axial chamber and annular chamber, chamois skin extending across the openings, means for supplying gasolene to the axial chamber, means for conducting water from the axial chamber, and means for conducting gasolene from the annular chamber.

2. A gasolene filter including a cylinder closed at one end, a cylinder head closing the other end, a filter proper fitting snugly within the cylinder and peripherally channeled intermediate its length to provide with the cylinder an annular chamber, the filter proper being formed with an interior chamber and with openings establishing communication between the interior and annular chambers, a covering of porous material about the filter proper and across the openings, means for supplying gasolene through the removable cylinder head to the interior chamber, and means for independently drawing liquid from the interior chamber and annular chamber.

3. A gasolene filter including a cylinder, a removable cylinder head closing one end of the cylinder and formed with an inwardly projecting boss, a filter proper fitting snugly within the cylinder and formed with an axial chamber opening through one end and normally closed by the boss, the filter proper being peripherally channeled exteriorly to provide with the cylinder an annular chamber and having its upper portion formed with openings establishing communication between the chambers, one end of the filter proper being formed with passages communicating with the axial and annular chambers, chamois skin extending across the openings, means for supplying liquid to the axial chamber, and pipes extending into the cylinder and into the passages whereby liquid may be withdrawn independently from the axial and annular chambers and whereby the filter proper can be disposed within the cylinder only in one position which in proper position of the cylinder will bring the openings of the filter proper uppermost.

In testimony whereof I affix my signature.

ADOLPHUS DAMERON. [L. S.]

Copies of this patent may be obtained for five cents each, by addressing the "Commissioner of Patents, Washington, D. C."